United States Patent [19]

Larrabee

[11] 3,960,753

[45] June 1, 1976

[54] FLUORESCENT LIQUID CRYSTALS

[75] Inventor: Robert Dean Larrabee, Princeton, N.J.

[73] Assignee: RCA Corporation, New York, N.Y.

[22] Filed: May 30, 1974

[21] Appl. No.: 474,600

[52] U.S. Cl............................ 252/299; 23/230 LC; 73/356; 252/301.16; 252/301.17; 350/150; 350/160 LC; 428/1
[51] Int. Cl.².................... C09K 3/34; C02F 1/16
[58] Field of Search....... 252/299, 408 LC, 301.2 R, 252/301.3 R; 350/150, 160 LC; 23/230 LC; 428/1; 73/356

[56] References Cited
UNITED STATES PATENTS

| | | | |
|---|---|---|---|
| 3,597,044 | 8/1971 | Castellano | 252/408 LC |
| 3,663,086 | 5/1972 | Assouline et al. | 252/299 |
| 3,703,329 | 11/1972 | Castellano | 252/299 |
| 3,771,065 | 11/1973 | Goldberg et al. | 252/408 LC |
| 3,844,637 | 10/1974 | Masi | 252/408 LC |
| 3,864,022 | 2/1975 | Moriyama et al. | 252/299 |

OTHER PUBLICATIONS

Lyle, S. J., et al., J. Chem. Soc., (Dalton Trans.) vol. 16, pp. 1726–1729, (1972).
Baur, G. et al., J. Appl. Phys., vol. 44, No. 4, pp. 1905–1906 (Apr. 1973).
Larrabee, R. D., RCA Review, vol. 34 (2), p. 329 (June 1973).

*Primary Examiner*—Benjamin R. Padgett
*Assistant Examiner*—T. S. Gron
*Attorney, Agent, or Firm*—Glenn H. Bruestle; Birgit E. Morris

[57] ABSTRACT

Liquid crystal compositions and liquid crystal thermometric articles, radiation sensors, and optical display devices comprised of a nematic liquid crystal solvent which is effectively transparent to radiation of near ultraviolet and visible wavelengths and a fluorescent solute whose visible fluorescent intensity varies with the phase or orientation of the liquid crystal solvent are disclosed.

5 Claims, 2 Drawing Figures

FLUORESCENT LIQUID CRYSTALS

FIELD OF THE INVENTION

The present invention relates to liquid crystal devices and compositions. More particularly, the present invention relates to liquid crystals containing a dissolved fluorescent material whose visible fluorescent intensity is dependent upon the phase or orientation of the liquid crystal solvent and to thermometric articles, radiation sensors, and optical displays containing these liquid crystals.

BACKGROUND

Nematic liquid crystal materials are finding wide use in display devices such as watch faces. One difficulty with conventional nematic liquid crystal devices is that they depend on the ambient light for illumination and often exhibit poor contrast under bright illumination. Therefore, it is highly desirable to develop liquid crystal compositions which give a high contrast with the surroundings when the liquid crystal changes phase or orientation.

Articles relating to the study of fluorescent solutes in liquid crystal solvents include:
1. E. Sachman, et al., J. Am. Chem. Soc. 90, 3569 (1968);
2. E. Sachman, et al., Chem. Phys. Letters 4, 537 (1970);
3. G. Baur, et al., J. Appl. Phys. 44, 1905 (1973);
4. H. Beens, et al., Chem. Phys. Letters 8, 341 (1970); and
5. R. D. Larrabee, RCA Review 34, 329 (1973).

Liquid crystals have also been used as anisotropic solvents to orient pleochroic nonfluorescent guest molecules and control their visible light absorption, see G. H. Heilmeier, et al., Mol. Cryst. and Cryst. 8, 293 (1969).

The use of a fluorescent material whose fluorescence is dependent on the phase or orientation of the liquid crystal could provide the high visual contrast desired in liquid crystal displays and devices. However, the interaction between liquid crystal materials and dissolved fluorescent solutes currently is not susceptible to delineation so that successful liquid crystal/fluorescent material combinations can be predicted. Therefore, it is highly desirable to develop such combinations which can be used in liquid crystal devices and displays.

SUMMARY OF THE INVENTION

The thermometric articles, radiation sensors, electro-optic devices, and liquid crystals disclosed herein employ a novel liquid crystal composition comprised of a liquid crystal solvent which is substantially transparent to near ultraviolet and visible radiation and a fluorescent solute whose visible fluorescent intensity varies with the phase or orientation of the liquid crystal solvent.

DESCRIPTION OF THE PREFERRED EMBODIMENT

Figure 1:
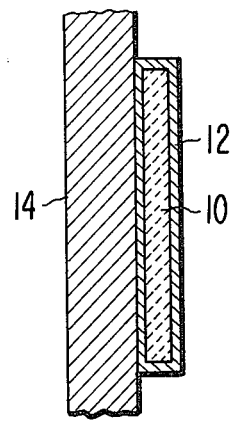
FIG. 1 is a cross-sectional view of a thermosensing device incorporating the present invention.

The present invention may be utilized in a number of thermal and radiation sensing devices and in liquid crystal optical displays well known to those skilled in the art. The present invention utilizes a differential visible fluorescence of guest fluorescent solutes resulting from excitation by unpolarized ultraviolet light to detect changes in the phase or orientation of host liquid crystal solvents. The phase or orientation change in the host liquid crystal solvent results from changes in the thermal, infra-red, electrical or magnetic ambience of the liquid crystal.

For a nematic liquid crystal to be acceptable for the purpose of the present invention, it must be substantially transparent to ultraviolet radiation in order to allow the exciting ultraviolet radiation to reach the dissolved fluorescent material or materials, it must be substantially transparent to visible light, and it must provide a suitable molecular environment for the dissolved fluorescent molecules so that these molecules will fluoresce strongly when excited by ultraviolet radiation. The fluorescent material must be soluble in the liquid crystal and its fluorescence must be strongly dependent upon the phase or orientation of the liquid crystal solvent.

Useful liquid crystal solvents include liquid crystals having the formula:

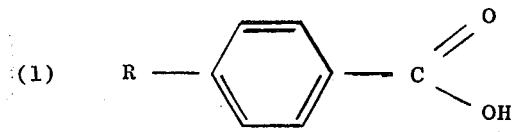

(1)

wherein R is $C_nH_{2n+1}-$ or $C_nH_{2n+1}CO-$ and $n$ is an integer from 1 to 10. An example of this group (1) of liquid crystal is p-n-butoxybenzoic acid which is nematic between about 146°C. and 161°C.

Other useful liquid crystals include liquid crystals having the formula:

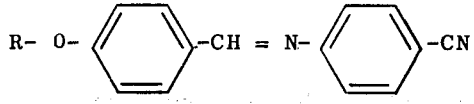

where R is $C_nH_{2n+1}-$ or $C_nH_{2n+1}CO-$ and $n$ is an integer from 1 to 10. Liquid crystals of the above group (2) will hereinafter be referred to as PEBAB.

Useful members of this series include p-n-hexacyloxybenzylidene -p'-aminobenzontrile (hereinafter PEBAB-70),

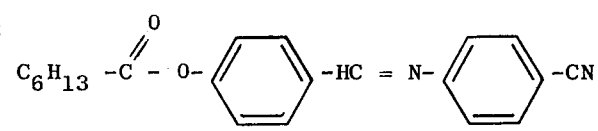

p-n-heptacyloxybenzylidene -p'-aminobenzonitrile (hereinafter PEBAB-80),

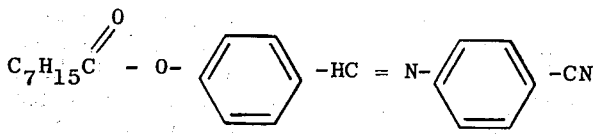

p-n-hexoxybenzylidene -p'-aminobenzonitrile (hereinafter PEBAB-6),

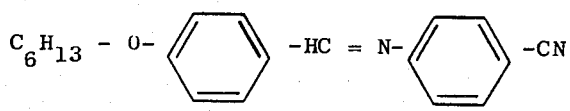

and an equimolar mixture of the above three liquid crystals (hereinafter PEBAB-RT). PEBAB-RT has a nematic range between 26° and 88°C.

Other liquid crystal solvents useful herein include Vari-Light VL-146176-N, with a nematic range between 146° to 176°C.; Vari-Light VL-74110-N with a nematic range between 74° to 110°C.; Vari-Light VR-3268-N, with a nematic range between 32° to 68°C.; Vari-Light VR-1047-N, with a nematic range between 10° to 47°C.; LCI-1 liquid crystal, with a nematic range between 18° to 80°C.; and p-azoxyanisole. The Vari-Light liquid crystals are available from the Vari-Light Corporation, Cincinnati, Ohio. LCI-1 liquid crystal is available from Liquid Crystal Industries, Furtile Creek, Pennsylvania.

Various liquid crystal solvents containing fluorescent solutes were evaluated by placing about 0.1 cc of liquid crystal material with about 1 mg. of fluorescent material or materials on a standard glass microscope slide. The slide was then placed on a hotplate to melt the liquid crystal and dissolve the solute. The solution was stirred for uniformity, heated to the isotropic liquid state, and removed from the hotplate while the liquid crystal was still isotropic. The slide was then viewed under unpolarized ultraviolet light and its fluorescence was observed.

About half of 182 selected organic materials tried were visibly fluorescent when dissolved in nematic p-n-butoxybenzoic acid. However, in most cases the intensity of the fluorescent material was low or there was no differential fluorescent activity shown when the host liquid crystal changed phase. Also, some fluorescent materials were insoluble in the liquid crystal whereas others did not fluoresce when dissolved in the liquid crystal solvent.

An europium chelate, 2,4,6-trimethylpyridinium tetrakis[1,1,1-trifluoro-4-(p-trifluoromethylphenyl)-2,4-butenedioxo]Europium (III), having the structure

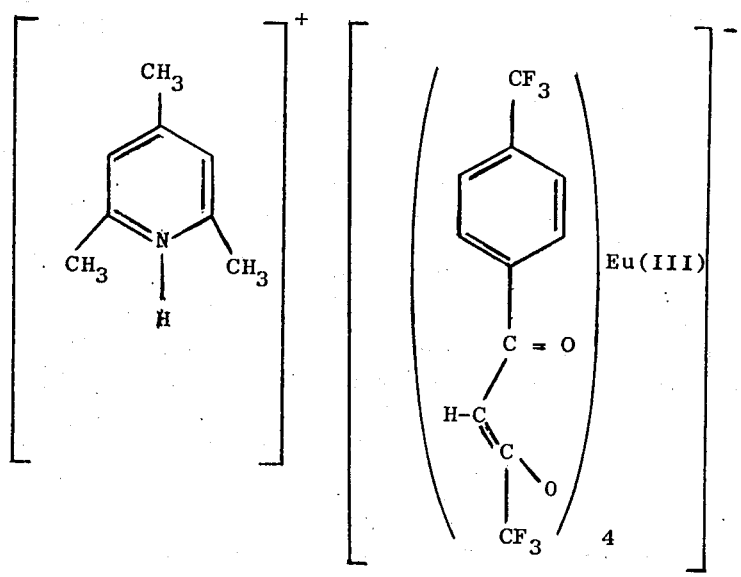

was used as a fluorescent solute. The above europium chelate will hereinafter be referred to as europium chelate.

Tables I-XI give the results of tests on fluorescent materials dissolved in liquid crystal solvents. The manufacturers for materials not well known to those skilled in the art are listed in an appendix to the tables.

TABLE I

FLUORESCENCE IN P-N-BUTOXYBENZOIC ACID

| FLUORESCENT MATERIAL | MANU-FACTURER | FLUORESCENT INTENSITY | | |
|---|---|---|---|---|
| | | HOT SOLID | NEMATIC | ISO-TROPIC |
| 1. Fluorescent Yellow C No. 4 | 3 | None | Good | Fair |
| 2. Azosol Brilliant Yellow | 2 | Poor | Good | Good |
| 3. Perylene | 4 | Poor | Good | Good |
| 4. Samaron Brilliant Yellow H6GL | 1 | None | Good | Good |
| 5. Thioflavine S | — | None | Good | Fair |
| 6. Vat Blue 18 | — | None | Good | Good |
| 7. Brilliant Sulfo Flavine | 1 | None | Good | Good |
| 8. 1,8-Diphenyl-1,3,5,7-octatetraene | — | None | Fair | Fair |
| 9. Acridine Yellow | 5 | None | Fair | Fair |
| 10. Acriflavine | 5 | None | Fair | Poor |
| 11. Rhodamine B | — | None | Fair | Fair |
| 12. Acridine Orange | 5 | Poor | Fair | Poor |
| 13. Eosine YB | — | Poor | Fair | Poor |
| 14. 2-2'-dihydroxy-1-1'-naphthalazine | — | Good | Fair | None |
| 15. Eosin | — | None | Fair | None |
| 16. Rhodamine 6GD | — | None | Fair | Fair |
| 17. Rhodamine 3GO | — | Poor | Fair | Fair |
| 18. Rhodamine 6GDN | — | Fair | Fair | Poor |
| 19. Rhodamine 6G | — | Poor | Fair | Fair |
| 20. Europium Chelate | — | Poor | None | None |
| 21. Anthracene | — | Good | None | None |
| 22. Anthracene & Tetracene | — | Good | Poor | Poor |
| 23. Chrysene | — | Good | Poor | None |
| 24. Triphenylene | 4 | Poor | None | None |
| 25. Lissamine Rhodamine B-200 | 5 | None | Poor | Fair |
| 26. Tetracene | — | None | Poor | Poor |
| 27. Calein Blue | 1 | Poor | Poor | Poor |
| 28. Eosine Y | — | None | None | None |
| 29. Acridine | — | None | None | None |
| 30. Pontamine White BT | — | None | None | None |
| 31. 4-4-Diamino Stilbene | — | Poor | Poor | Poor |
| 32. Stilbene | — | Poor | Poor | Poor |
| 33. 4-Methyl Umbelliferone | 7 | Poor | Poor | Poor |
| 34. Rubrene | 4 | Poor | Poor | Poor |
| 35. 9-10 Diphenyl Anthracene | — | Poor | Poor | Poor |
| 36. Fluoranthene | — | Good | Good | Fair |
| 37. Brilliant Phosphine | 5 | Poor | Fair | Fair |
| 38. Primulin O | 5 | None | Fair | Fair |
| 39. Pyronin GS | 5 | Fair | Fair | Fair |

TABLE II

FLUORESCENCE IN VARI-LIQUID CRYSTALS VARI-LIGHT VL-146176-N

| FLUORESCENT MATERIAL | MANU-FACTURER | FLUORESCENT INTENSITY | | |
|---|---|---|---|---|
| | | HOT SOLID | NE-MATIC | ISO-TROPIC |
| 1. Fluorescent Yellow C No. 4 | 3 | None | Fair | None |
| 2. Azosol Brilliant Yellow | 2 | Poor | Good | Good |
| 3. Perylene | 4 | None | Good | Fair |
| 4. Samaron Brilliant Yellow H6GL | 1 | None | Good | Good |
| 5. Thioflavine S | — | Poor | Good | Fair |
| 6. Vat Blue 18 | — | None | Fair | Fair |
| 7. Brilliant Sulfo Flavine | 1 | None | Fair | Good |
| 8. Fluoranthene | — | Good | Fair | Fair |
| 9. Europium Chelate | — | None | None | None |

TABLE III

VARI-LIGHT VL74110-N

| FLUORESCENT MATERIAL | MANU-FAC-TURER | FLUORESCENT INTENSITY | | |
|---|---|---|---|---|
| | | HOT SOLID | NE-MATIC | ISO-TROPIC |
| 1. Fluorescent Yellow C No. 4 | 3 | None | None | None |
| 2. Azosol Brilliant Yellow | 2 | Poor | Poor | None |
| 3. Perylene | 4 | Poor | None | None |
| 4. Samaron Brilliant Yellow H6GL | 1 | None | None | None |
| 5. Thioflavine S | — | None | None | None |
| 6. Vat Blue 18 | — | None | None | None |
| 7. Brilliant Sulfo Flavine | 1 | None | None | None |
| 8. Fluoranthene | — | None | None | None |
| 9. Europium Chelate | — | Good | None | None |

TABLE IV

VARI-LIGHT VR-3268-N

| FLUORESCENT MATERIAL | MANU-FAC-TURER | FLUORESCENT INTENSITY | | |
|---|---|---|---|---|
| | | HOT SOLID | NEMATIC | ISO-TROPIC |
| 1. Fluorescent Yellow C No. 4 | 3 | Poor | None | None |
| 2. Azosol Brilliant Yellow | 2 | Poor | None | None |
| 3. Perylene | 4 | None | None | None |
| 4. Samaron Brilliant Yellow H6GL | 1 | Poor | None | None |
| 5. Thioflavine S | — | Poor | None | None |
| 6. Vat Blue 18 | — | Poor | Poor | None |
| 7. Brilliant Sulfo Flavine | 1 | Poor | None | None |
| 8. Fluoranthene | — | Good | None | None |
| 9. Europium Chelate | — | Good | None | None |

TABLE V

VARI-LIGHT VR-1047-N

| FLUORESCENT MATERIAL | MANU-FAC-TURER | FLUORESCENT INTENSITY | | |
|---|---|---|---|---|
| | | HOT SOLID | NEMATIC | ISO-TROPIC |
| 1. Fluorescent Yellow C No. 4 | 3 | None | Poor | None |
| 2. Azosol Brilliant Yellow | 2 | Fair | Poor | None |
| 3. Perylene | 4 | Poor | Poor | None |
| 4. Samaron Brilliant Yellow H6GL | 1 | None | None | None |
| 5. Thioflavine S | 5 | None | None | None |
| 6. Vat Blue 18 | — | None | None | None |
| 7. Brilliant Sulfo Flavine | 1 | None | None | None |
| 8. Fluoranthene | — | Poor | None | None |
| 9. Europium Chelate | — | Fair | None | None |

TABLE VI

FLUORESCENCE IN LCI-1 18–80°C LIQUID CRYSTALS

| FLUORESCENT MATERIAL | MANU-FAC-TURER | FLUORESCENT INTENSITY | | |
|---|---|---|---|---|
| | | HOT SOLID | NEMATIC | ISO-TROPIC |
| 1. Fluorescent Yellow C No. 4 | 3 | None | None | None |
| 2. Azosol Brilliant Yellow | 2 | None | None | None |
| 3. Perylene | 4 | None | None | None |
| 4. Samaron Brilliant Yellow H6GL | 1 | None | None | None |
| 5. Thioflavine S | — | None | None | None |
| 6. Vat Blue 18 | — | None | None | None |
| 7. Brilliant Sulfo Flavine | 1 | None | None | None |
| 8. Fluoranthene | — | None | None | None |
| 9. Europium Chelate | — | Good | None | None |

TABLE VII

FLUORESCENCE IN PEBAB LIQUID CRYSTALS PEBAB 70

| FLUORESCENT MATERIAL | MANU-FAC-TURER | FLUORESCENT INTENSITY | | |
|---|---|---|---|---|
| | | HOT SOLID | NEMATIC | ISO-TROPIC |
| 1. Fluorescent Yellow C No. 4 | 3 | Poor | Poor | None |
| 2. Azosol Brilliant Yellow | 2 | Fair | Fair | None |
| 3. Perylene | 4 | Poor | None | None |
| 4. Samaron Brilliant Yellow H6GL | 1 | Poor | None | None |
| 5. Thioflavine S | — | None | None | None |
| 6. Vat Blue 18 | — | None | None | None |
| 7. Brilliant Sulfo Flavine | 1 | None | None | None |
| 8. Fluoranthene | — | Poor | None | None |
| 9. Europium Chelate | — | Good | None | None |

TABLE VIII

PEBAB 6

| FLUORESCENT MATERIAL | MANU-FAC-TURER | FLUORESCENT INTENSITY | | |
|---|---|---|---|---|
| | | HOT SOLID | NEMATIC | ISO-TROPIC |
| 1. Fluorescent Yellow C No. 4 | 3 | Poor | Poor | None |
| 2. Azosol Brilliant Yellow | 4 | Fair | Fair | None |
| 3. Perylene | 2 | Poor | Poor | None |
| 4. Samaron Brilliant Yellow H6GL | 1 | Poor | None | None |
| 5. Thioflavine S | — | Poor | Poor | None |
| 6. Vat Blue 18 | — | None | None | None |
| 7. Brilliant Sulfo Flavine | 1 | None | None | None |
| 8. Fluroanthene | — | Poor | None | None |
| 9. Europium Chelate | — | Good | None | None |

TABLE IX

PEBAB 80

| FLUORESCENT MATERIAL | MANU-FAC-TURER | FLUORESCENT INTENSITY | | |
|---|---|---|---|---|
| | | HOT SOLID | NEMATIC | ISO-TROPIC |
| 1. Azosol Brilliant Yellow | 2 | Poor | Good | Poor |
| 2. Fluorescent Yellow C No. 4 | 3 | Good | Fair | Poor |

TABLE X

PEBAB RT

| FLUORESCENT MATERIAL | MANU-FAC-TURER | FLUORESCENT INTENSITY | | |
|---|---|---|---|---|
| | | HOT SOLID | NEMATIC | ISO-TROPIC |
| 1. Azosol Brilliant Yellow | 2 | Good | Good | Poor |
| 2. Fluorescent Yellow C No. 4 | 3 | Good | Fair | Poor |
| 3. Europium Chelate | — | Good | Good | Poor |

TABLE XI

FLUORESCENCE IN P-AZOXYANISOLE

| FLUORESCENT MATERIAL | MANU-FAC-TURER | FLUORESCENT INTENSITY | | |
|---|---|---|---|---|
| | | HOT SOLID | NEMATIC | ISOTROPIC |
| 1. Fluorescent Yellow C No. 4 | 3 | None | Poor | None |
| 2. Azosol Brilliant Yellow | 2 | Poor | Poor | None |
| 3. Perylene | 4 | Poor | Poor | None |
| 4. Samaron Brilliant Yellow H6GL | 1 | None | None | None |
| 5. Thioflavine S | — | None | None | None |
| 6. Vat Blue 18 | — | None | None | None |
| 7. Brilliant Sulfo Flavine | 1 | Poor | None | None |
| 8. Fluoranthene | — | None | None | None |
| 9. Europium Chelate | — | None | None | None |

A fluorescent solute may be used in conjunction with an electric-field-induced or magnetic-field-induced phase or orientation transition in a nematic liquid crystal solvent. Some structurally unsymmetrical fluorescent materials have the property that their optical absorption is a function of the direction of the exciting radiation relative to their molecular axis. This property is called pleochroism. When such a pleochroic material is dissolved in a nematic liquid crystal, the orientation of the liquid crystal solvent can control the orientation of the fluorescent solute. Thus, by controlling the orientation of the liquid crystal solvent it is possible to control the ultraviolet absorption of the pleochroic solute. Since ultraviolet absorption is a prerequisite for fluorescence, the fluorescence of the pleochroic solute will be a function of the orientation of the liquid crystal solvent.

A pleochroic dye may have a molecular structure with one axis of the molecule significantly longer than the others. The ultraviolet absorption of such a molecule is generally greatest when the direction of the incident light is perpendicular to the long axis of the molecule and is least when parallel to it. When such a fluorescent material is dissolved in a nematic liquid crystal solvent contained in a conventional liquid crystal cell, wherein the liquid crystal is disposed between transparent electrodes and a voltage is applied across the electrodes, the nematic liquid crystal molecules align themselves and the fluorescent solute molecules in a direction perpendicular to the electrodes and, thus, at the same time, parallel to the direction of the incident ultraviolet light. This results in a minimum fluorescence of the pleochroic solute. Removal of the voltage allows the liquid crystal solvent to realign itself and the pleochroic solute parallel to the electrode surfaces and perpendicular to the incident ultraviolet light, causing the pleochroic solute to absorb the incident ultraviolet light. This increased absorption is evidenced by increased fluorescence. It is possible to excite the pleochroic solute using unpolarized ultraviolet radiation incident on either electrode.

Table XII lists materials which exhibited the strongest fluorescent, intensity when dissolved in nematic p-n-butoxybenzoic acid as judged by comparison to a standard control reference, i.e., Azosol Brilliant Yellow. All of the materials listed in Table XII were tested for pleochroism in a conventional 2-mil thick, liquid crystal cell at a concentration in p-n-butoxybenzoic acid such that they fluoresced brightly with no voltage applied. The decrease in fluorescence (if any) with applied voltage was noted and subjectively compared to a standard, i.e., perylene. Four materials were found that were judged more pleochroic than the standard and are rated strongly pleochroic.

TABLE XII

STRONGLY FLUORESCENT MATERIALS IN NEMATIC p-BUTOXYBENZOIC ACID

| FLUORESCENT MATERIAL | SOURCE | RELATIVE FLUORESCENCE | OBSERVED PLEOCHROISM |
|---|---|---|---|
| 1. Azosol Brilliant Yellow | 4 | Reference | None |
| 2. Samaron Brilliant Yellow H6GL | 1 | Stronger | Strong |
| 3. Perylene | 4 | Stronger | Fair |
| 4. Brilliant Sulfo Flavine | 2 | Stronger | None |
| 5. p-Quinquiphenyl | 6 | Stronger | None |
| 6. Fluoranthene | — | Stronger | None |
| 7. 9,10-Diphenylanthracene | — | Stronger | None |
| 8. p-Sexiphenyl | 6 | Stronger | None |
| 9. Brilliant Phosphine | 5 | Same | Strong |
| 10. Primulin O | 5 | Same | Strong |
| 11. 1,8-Diphenyl-1,3,5,7-octatetraene | — | Same | Strong |
| 12. Acridine Yellow | 5 | Same | Fair |
| 13. Thioflavine S | — | Same | Fair |
| 14. Pyronin GS | 5 | Same | Fair |
| 15. 1,12-Benzperylene | 6 | Same | Fair |
| 16. Acriflavine | 5 | Same | Poor |
| 17. Ovalene | 6 | Same | Poor |
| 18. Anthanthrene | — | Same | None |
| 19. 3,4,9,10-Dibenzpyrene | 6 | Same | None |
| 20. 3,4,8,9-Dibenzpyrene | 6 | Same | None |
| 21. Rhodamine 6G | — | Poorer | Fair |
| 22. Rhodamine 3GO | — | Poorer | Fair |
| 23. Rhodamine 6GD | — | Poorer | Fair |
| 24. Rhodamine B | — | Poorer | Poor |

The pleochroism of these four materials was measured more quantitatively using a photocell to measure the change in fluorescence when a saturating voltage (about 40 volts) was applied to the same liquid-crystal cell. For these quantitative measurements, the weight concentration of fluorescent material in the nematic solvent was held constant at about 0.01% by weight a value found to be optimum for the fluorescence of 1,8-diphenyl-1,3,5,7-octatetraene. Table XIII shows the results of these tests.

TABLE XIII

MEASUREMENTS OF FLUORESCENCE SWITCHING IN p-n-BUTOXYBENZOIC ACID LIQUID CRYSTAL CELLS

| FLUORESCENT MATERIAL | RATIO OF ON-TO-OFF FLUORESCENT INTENSITIES |
|---|---|
| 1. Brilliant Phosphine | 3.0 to 1 |
| 2. Primulin O | 1.7 to 1 |
| 3. 1,8-diphenyl-1,3,5,7-octatetraene | 1.5 to 1 |
| 4. Samaron Brilliant Yellow H6GL | 1.3 to 1 |

The above liquid crystal solvents containing fluorescent dye solutes may be used in thermal sensing devices as illustrated by FIG. 1. Referring now to FIG. 1, a liquid crystal solvent 10 containing a fluorescent dye solute, e.g., p-n-butoxybenzoic acid containing Fluorescent Yellow C No. 4, is placed in a vessel 12 which is transparent to ultraviolet and visible radiation. The vessel 12 may be made of a glass, clear plastic or the like. The vessel 12 containing the liquid crystal solvent with a fluorescent dye solute 10 is disposed on a body 14 whose temperature is to be monitored. When the temperature of this body 14 reaches between about 147°C. to 161°C., the p-n-butoxybenzoic acid solute undergoes a mesomorphic phase change and the Fluorescent Yellow C No. 4 solute fluoresces.

The liquid crystal solvents containing a fluorescent solute which differentially fluoresce dependent upon the phase or orientation of the liquid crystal solvent also may be used in other thermometric articles, e.g., thermometric articles described in U.S. Pat. No. 3,619,254. In a similar manner, the present invention may be used to indicate when the temperature of a body drops below a prescribed temperature by noting the fluorescence or lack of fluorescence in the adjacent liquid crystal.

The present invention may be used as a thermosensor by simply applying the liquid crystal composition to the surface of the body whose temperature is to be monitored and observing the change in fluorescence as the body changes temperature. Since liquid crystals often oxidize rapidly the period of time this thermosensing means would be useful might be limited.

Liquid crystal compositions of the present invention can be used as radiation detectors, e.g., infra-red radiation detectors. In such a device the liquid crystal composition of the present invention is enclosed in a material which is transparent to visible and ultraviolet radiation and to radiation of the wavelength to be detected. When radiation of the wavelength to be detected strikes the liquid crystal composition in sufficient intensity to cause a phase or orientation change in the liquid crystal the fluorescent intensity of the fluorescent solute changes. Thus, this change in fluorescence can be used to detect and measure the incident radiation.

Figure 2:
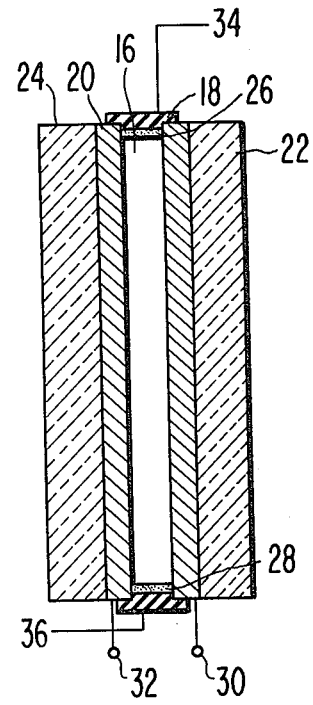
FIG. 2 is a cross-sectional view of an electro-optic cell incorporating the present invention.

The present invention may be used in a nematic liquid crystal cell used in electro-optic devices, e.g., watch displays, as illustrated in FIG. 2. Referring now to FIG. 2, a nematic liquid crystal solvent, 16, e.g., p-n-butoxybenzoic acid, containing a pleochroic fluorescent dye solute, e.g., Brilliant Phosphine, is disposed between one or more thin transparent electrodes 18 and 20, e.g., antimony doped tin oxide films about 1000 to 1500 A thick, deposited on one or more clear plates 22 and 24, e.g., glass plates. The surfaces of the clear plates 22 and 24 upon which the electrodes 18 and 20 are disposed are parallel to and opposite to each other and separated by spacers 26 and 28. The spacing between the electrodes 18 and 20 may vary from about 5 to 50 $\mu$ with nominal values being in the 10–20 $\mu$ range. The electrodes 18 and 20 are connected to leads 30 and 32 which in turn are connected to a voltage source (not shown). The liquid crystal cell is sealed with hermetic, water-tight seals 34 and 36. When a voltage is applied across the electrodes 18 and 20 the fluorescence of the fluorescent solute changes, e.g., the fluorescence of Brilliant Phosphine dissolved in p-n-butoxybenzoic acid decreases.

APPENDIX

The manufacturers of the fluorescent material corresponding to the numbers listed in the preceding Tables are:
1. American Hoechst Corporation, Mountainside, New Jersey
2. GAF Corporation, New York, New York
3. Patent Chemicals, Incorporated, Paterson, New Jersey
4. Aldrich Chemical Company, Cedar Knolls, New Jersey
5. Roloz Surgical Instrument Company, Washington, D.C.
6. K and K Laboratories, Plainview, New York
7. Eastman Kodak Company, Rochester, New York

What is claimed is:

1. A composition which exhibits fluorescent intensity variations at its solid to mesomorphic or mesomorphic to isotropic phase transition comprising a solution of one or a mixture of liquid crystal compounds of the formula

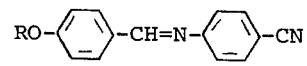

wherein R is $C_nH_{2n+1}-$ or $C_nH_{2n+1}CO-$ and $n$ is an integer from 1–10 and an amount of 2, 4, 6-trimethylpyridinium tetrakis [1, 1, 1-trifluoro-4-(p-trifluoromethylphenyl)-2, 4-butenedioxo] europium III effective to induce said variations.

2. The composition of claim 1 wherein said liquid crystal compound is p-n-hexacyloxybenzylidene-p'-aminobenzonitrile.

3. The composition of claim 1 wherein said liquid crystal compound is p-n-heptacyloxybenzylidene-p'-aminobenzonitrile.

4. The composition of claim 1 wherein said liquid crystal compound is p-n-hexoxybenzylidene-p'-aminobenzonitrile.

5. The composition of claim 1 wherein said mixture of liquid crystal compounds is an equimolar mixture of p-n-hexacyloxybenzlidene-p'-aminobenzonitrile, p-n-heptacyloxybenzylidene-p'-aminobenzonitrile, and p-n-hexoxybenzylidene-p'-aminobenzonitrile.

* * * * *